United States Patent
Perez-Ruiz et al.

(10) Patent No.: US 10,946,816 B2
(45) Date of Patent: Mar. 16, 2021

(54) ELASTIC AVERAGING SHUT-OFF SLOT

(71) Applicant: GM Global Technology Operations LLC, Detroit, MI (US)

(72) Inventors: Alejandro Perez-Ruiz, Warren, MI (US); Steven Morris, Fair Haven, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 117 days.

(21) Appl. No.: 16/184,418

(22) Filed: Nov. 8, 2018

(65) Prior Publication Data
US 2020/0148135 A1     May 14, 2020

(51) Int. Cl.
*B60R 13/02*     (2006.01)
*B62D 27/04*     (2006.01)
*F16B 1/00*     (2006.01)

(52) U.S. Cl.
CPC .......... *B60R 13/0206* (2013.01); *B62D 27/04* (2013.01); *F16B 1/00* (2013.01)

(58) Field of Classification Search
CPC ........ B60R 13/0206; F16B 1/00; B62D 27/04
See application file for complete search history.

(56) References Cited

U.S. PATENT DOCUMENTS

| | | | |
|---|---|---|---|
| 7,005,804 B2 | 2/2006 | Morris | |
| 7,142,101 B2 | 11/2006 | Morris | |
| 7,224,643 B2 | 5/2007 | Morris | |
| 7,356,387 B2 | 4/2008 | Morris et al. | |
| 7,364,189 B2 | 4/2008 | Morris et al. | |
| 7,401,838 B2 | 7/2008 | Morris et al. | |
| 7,478,833 B2 | 1/2009 | Morris et al. | |
| 7,478,860 B2 | 1/2009 | Lawall et al. | |
| 7,494,170 B2 | 2/2009 | Hanzel et al. | |
| 7,543,675 B2 | 6/2009 | Morris | |
| 7,761,209 B2 | 7/2010 | Morris et al. | |
| 7,766,422 B2 | 8/2010 | Edwards et al. | |
| 7,784,819 B2 | 8/2010 | Lawall et al. | |
| 7,810,837 B2 | 10/2010 | Thomas et al. | |
| 7,845,362 B2 | 12/2010 | Morris et al. | |
| 7,891,623 B2 | 2/2011 | Haddad et al. | |
| 7,905,547 B2 | 3/2011 | Lawall et al. | |
| 7,909,403 B2 | 3/2011 | Lawall et al. | |
| 8,100,471 B2 | 1/2012 | Lawall et al. | |
| 8,695,201 B2 | 4/2014 | Morris | |
| 8,726,473 B2 * | 5/2014 | Dole | B60R 13/0206 24/297 |
| 9,061,403 B2 | 6/2015 | Colombo et al. | |
| 9,061,715 B2 | 6/2015 | Morris | |
| 9,067,379 B2 | 6/2015 | Morris | |
| 9,067,625 B2 * | 6/2015 | Morris | B62D 27/023 |
| 9,156,506 B2 | 10/2015 | Colombo et al. | |
| 9,216,704 B2 | 12/2015 | Morris et al. | |
| 9,238,488 B2 | 1/2016 | Kiester et al. | |
| 9,243,655 B2 | 1/2016 | Morris et al. | |
| 9,278,642 B2 | 3/2016 | Colombo et al. | |

(Continued)

*Primary Examiner* — John C Hong

(57) ABSTRACT

A method of aligning a first component and a second component with elastic averaging includes offsetting a first part and a second part of the first component and creating a shut-off slot between the first part and the second part of the first component by offsetting the first part and the second part. The shut-off slot has a slot vector that is not parallel to a main die vector.

20 Claims, 3 Drawing Sheets

(56) References Cited

U.S. PATENT DOCUMENTS

| | | |
|---|---|---|
| 9,297,400 B2 | 3/2016 | Morris et al. |
| 9,303,667 B2 | 4/2016 | Morris et al. |
| 9,382,935 B2 | 7/2016 | Morris et al. |
| 9,388,838 B2 | 7/2016 | Morris et al. |
| 9,425,592 B2 | 8/2016 | Morris et al. |
| 9,428,046 B2 | 8/2016 | Morris et al. |
| 9,428,123 B2 | 8/2016 | Morris et al. |
| 9,429,176 B2 | 8/2016 | Morris et al. |
| 9,446,722 B2 | 9/2016 | Morris et al. |
| 9,447,806 B2 | 9/2016 | Morris et al. |
| 9,447,840 B2 | 9/2016 | Morris et al. |
| 9,457,845 B2 | 10/2016 | Morris et al. |
| 9,458,876 B2 | 10/2016 | Morris et al. |
| 9,463,538 B2 | 10/2016 | Morris |
| 9,463,829 B2 | 10/2016 | Colombo et al. |
| 9,463,831 B2 | 10/2016 | Morris et al. |
| 9,481,317 B2 | 11/2016 | Morris et al. |
| 9,488,205 B2 | 11/2016 | Morris et al. |
| 9,511,802 B2 | 12/2016 | Morris et al. |
| 9,541,113 B2 | 1/2017 | Morris et al. |
| 9,556,890 B2 | 1/2017 | Colombo et al. |
| 9,599,279 B2 | 3/2017 | Morris et al. |
| 9,618,026 B2 | 4/2017 | Morris et al. |
| 9,657,807 B2 | 5/2017 | Morris et al. |
| 9,758,110 B2 | 9/2017 | Morris et al. |
| 9,863,454 B2 | 1/2018 | Morris et al. |
| 9,969,257 B2 | 5/2018 | Dallos, Jr. et al. |

\* cited by examiner

ELASTIC AVERAGING SHUT-OFF SLOT

INTRODUCTION

The present disclosure relates to forming an assembly. More specifically, the present disclosure relates to forming an assembly with elastic averaging alignment.

Currently, components, such as those found in motor vehicles and other manufactured vehicle items, as well, as those found in non-motor vehicle manufactured items, are mated together in a process and are mutually located with respect to each other by alignment features that are sized to provide spacing to freely move the components relative to one another to align them without creating an interference therebetween that would hinder the manufacturing process. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. When such misalignment occurs, it can negatively affect function and result in a perception of poor quality.

Thus, while current assemblies achieve their intended purpose, there is a need for a new and improved system and method for assembling two components.

SUMMARY

According to several aspects, a method of aligning a first component and a second component with elastic averaging includes offsetting a first part and a second part of the first component and creating a shut-off slot between the first part and the second part of the first component by offsetting the first part and the second part. The shut-off slot has a slot vector that is not parallel to a main die vector.

In an additional aspect of the present disclosure, the method further includes pressing together a first part and a second part of a tool with the first component located between the first part and the second part of the tool to offset the first part and the second part of the first component.

In another aspect of the present disclosure, the main die vector is defined by a direction of placement of the first part and the second part of the tool.

In another aspect of the present disclosure, the method further includes removing the tool.

In another aspect of the present disclosure, the method further includes inserting the second component into the first component.

In another aspect of the present disclosure, the second component has a vector that is not parallel to the slot vector.

In another aspect of the present disclosure, the second component has a center portion that engages with the second part of the first component.

In another aspect of the present disclosure, the second component has side portions that are in contact with the first part of the first component.

In another aspect of the present disclosure, the amount of offset between the first part and the second part is defined by a shut-off angle.

According to several aspects, a system for elastic averaging alignment includes a tool with a first part and a second part, and a first component with a first part and a second part. The first component is placed between the first part and the second part of the tool, and a shut-off slot is created between the first part and the second part of the first component when the first part and the second part of the tool are pressed together to offset the first part and the second part of the first component.

In another aspect of the present disclosure, the shut-off slot has a slot vector that is not parallel to a main die vector.

In another aspect of the present disclosure, the main die vector is defined by a direction of placement of the first part and the second part of the tool.

In another aspect of the present disclosure, the first component is configured to receive a second component.

In another aspect of the present disclosure, the second component has a vector that is not parallel to the slot vector.

In another aspect of the present disclosure, the second component has a center portion that engages with the second part of the first component.

In another aspect of the present disclosure, the second component has side portions that are in contact with the first part of the first component.

In another aspect of the present disclosure, the amount of offset between the first part and the second part is defined by a shut-off angle.

According to several aspects, a method of aligning a first component and a second component with elastic averaging includes positioning the first component between a tool with a first part and a second part, pressing together the first part and the second part of the tool to offset a first part and a second part of the first component, and creating a shut-off slot between the first part and the second part of the first component by offsetting the first part and the second part. The shut-off slot has a slot vector that is not parallel to a main die vector, the main die vector being defined by a direction of placement of the first part and the second part of the tool.

In another aspect of the present disclosure, the method further includes removing the tool and inserting the second component into the first component wherein the second component has a vector that is not parallel to the slot vector.

In another aspect of the present disclosure, the amount of offset between the first part and the second part is defined by a shut-off angle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
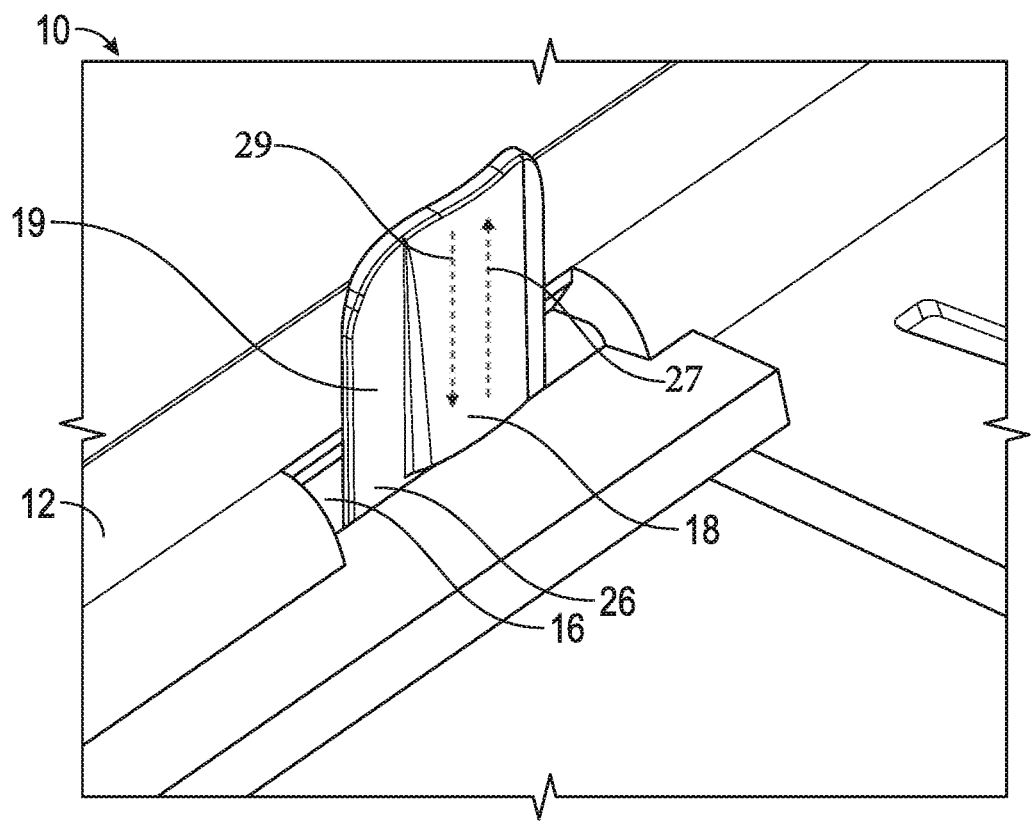
FIG. 1 is a perspective view of an assembly with a first component and an second component aligned by elastic averaging.

Referring to FIG. 1, there is shown an assembly 10 with a first component 12 and a second component 19. Typically, the second component 19 is inserted through a slot 16 of the first component 12 to join or mate the two components to together. To ensure proper alignment of the two components 12 and 19, a vector 29 of the second component 19 is aligned parallel to a vector 27 through the slot 16 of the first component 12. The second component 19 has a center portion 18 and side portions 26 on either side of the center portion 18. The second portion 19 is oversized such that as the second portion is inserted into to slot 16 in the direction of the vector 29, the first component 12 and the second component 19 elastic deform for elastic averaging coupling between the two components 12 and 19. Elastic averaging represents a subset of surface coupling types where improved accuracy is derived from the averaging of error over a large number of contacting surfaces. Elastic averaging is based on significantly over-constraining a solid body with a large number of relatively compliant members. As the components are preloaded, the elastic properties of the components allow for the size and position error of each individual contact feature to be averaged out over the sum of contact features throughout the solid body. In a well designed and preloaded elastic averaging coupling, the repeatability is approximately inversely proportional to the square root of the number of contact points.

During the manufacturing process, there is the potential that the vectors 27 and 29 do not align in a parallel manner. For example, referring to FIG. 2A, there is shown the component 12 slightly tilted from a horizontal line 31, as indicated by a line 33, which represents the orientation of the top surfaces of a first part 44 and a second part 46 of the first component 12. As such, the vector 27 through the slot 16 is no longer parallel to the vector 29 extending through the second component 19, which may result in misalignment of the first component 12 and the second component 19 during the manufacturing of the assembly 10.

Figure 2A:
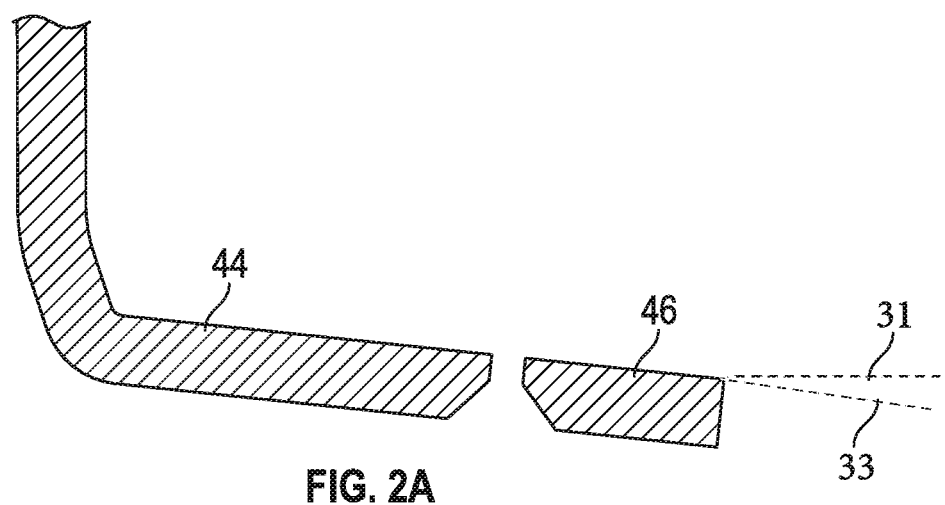
FIG. 2A is a side cross-sectional view of the first component.
Figure 2B:
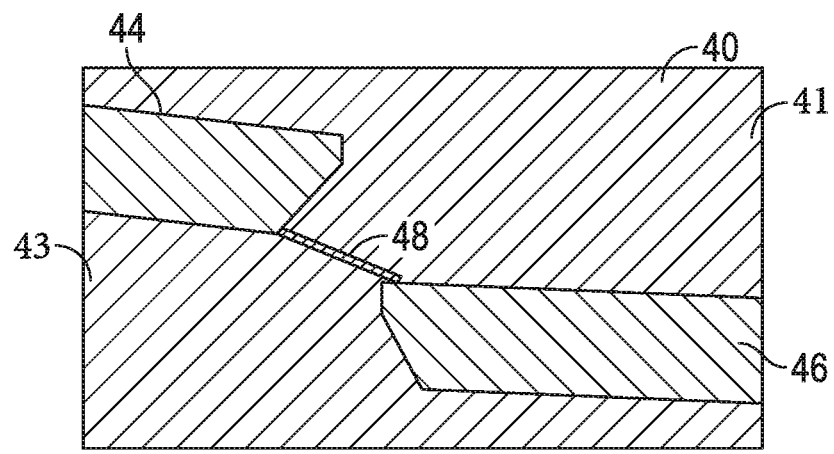
FIGS. 2B and 2C are side cross-sectional views of the first component having a first part and a second part being offset.

To compensate for the possible misalignment between the two components 12 and 19, a tool 40 is utilized in accordance with the principles of the present disclosure, as shown in FIG. 2B. Specifically, a first part 41 and a second part 43 of the tool 40 are pressed together to offset the first part 44 and the second part 46 of the first component 12, such that a line that extends along the top surface of the first part 44 no longer extends along the top surface of the second part 46.

The offsetting of the first part 44 and the second part 46 of the first component 12 is indicated by a shut-off angle 48. The gap or a shut-off slot 51 between the first part 44 and the second part 46 of the first component 12 defines a shut-off vector 49 that extends through the shut-off slot 51 between the two parts 44 and 46.

Figure 2C:
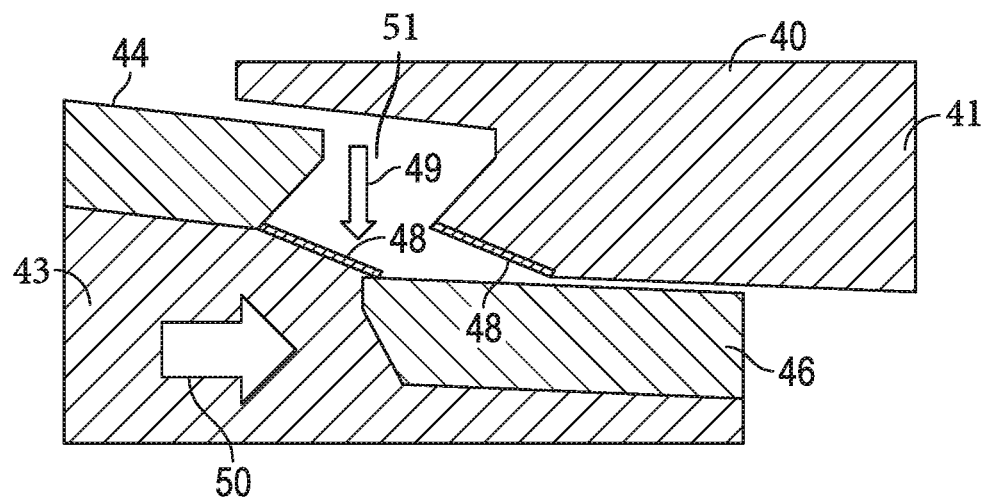
Figure 2D:
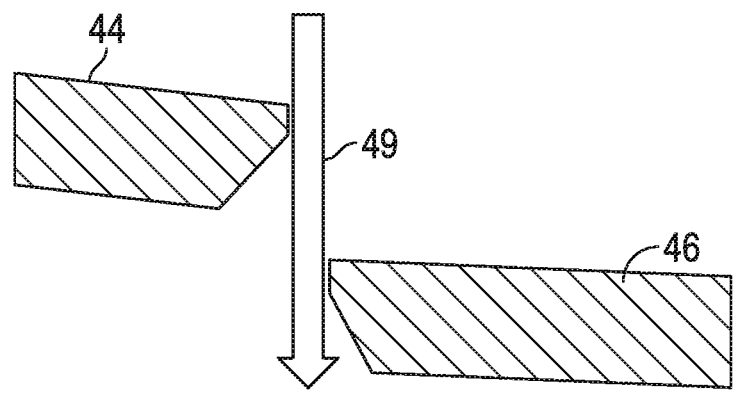
FIG. 2D is a side-cross section view of first component after the first part and the second part are offset.
Figure 3A:
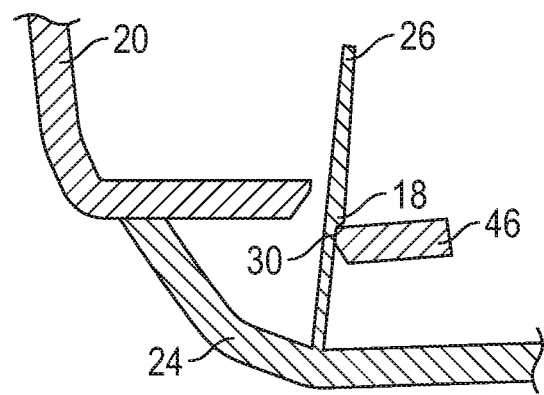
FIG. 3A is a side cross-sectional view of a center portion of a second component inserted into the first component.
Figure 3B:
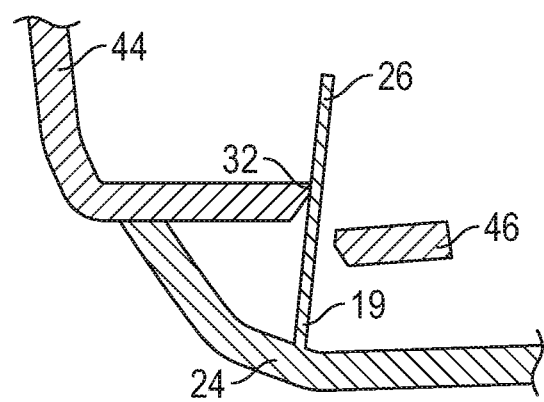
FIG. 3B is a side cross-sectional view of a side portion of the second component inserted into the first component.

As shown in FIG. 2C, the positioning or placement of the first part 41 and the second part 43 of the tool 40 define a die vector 50 which is not parallel (in some cases, perpendicular) to the shut-off vector 49 to ensure proper alignment between the first component 12 and the second component 19 during the ultimate assembly of the two components. When the first part 41 and the second part 43 of the tool 40 are removed, the first part 44 and the second part 46 of the first component 12 remain offset with the shut-off vector 49 extending through the first part 44 and the second part 46 of the first component Referring to FIGS. 3A and 3B, there are shown the final assembly of the offset first part 44 and the second part 46 of the first component 12 with the second component 19, which is shown as an extension of a feature 24. As can be seen in FIG. 3A, the center portion 18 of the second component 19 engages with an edge 30 of the second part 46 of the first component 12 when the first component 12 and the second component 19 are properly aligned. And in FIG. 3B, the side portions 26 of the second component 19 are engaged with an edge 32 of the first part of the first component 12, indicating the second component 19 is properly coupled to the first component 12. As such, even though the tilting of the first component 12 relative to the second component 19, as shown in FIG. 2A, results in potential misalignment between the first component 12 and the second component 19, a particular benefit of the utilization of the tool 40 is the capability to offset the two parts 44, 46 of the first component 12 to ensure that the second component 19 couples properly to the first component 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of aligning a first component and a second component with elastic averaging, the method comprising:
    offsetting a first part and a second part of the first component; and
    creating a shut-off slot between the first part and the second part of the first component by offsetting the first part and the second part,
    wherein the shut-off slot has a slot vector that is not parallel to a main die vector.

2. The method of claim 1 further comprising pressing a first part and a second part of a tool with the first component located between the first part and the second part of the tool to offset the first part and the second part of the first component.

3. The method of claim 2 wherein the main die vector is defined by a direction of placement of the first part and the second part of the tool.

4. The method of claim 1 further comprising removing the tool.

5. The method of claim 4 further comprising inserting the second component into the first component.

6. The method of claim 5 wherein the second component has a vector that is not parallel to the slot vector.

7. The method of claim 5 wherein the second component has a center portion that engages with the second part of the first component.

8. The method of claim 5 wherein the second component has side portions that are in contact with the first part of the first component.

9. The method of claim 1 wherein the amount of offset between the first part and the second part is defined by a shut-off angle.

10. A system for elastic averaging alignment, the system comprising:
    a tool with a first part and a second part; and
    a first component with a first part and a second part, wherein the first component is placed between the first part and the second part of the tool, and wherein a shut-off slot is created between the first part and the second part of the first component when the first part and the second part of the tool are pressed together to offset the first part and the second part of the first component.

11. The system of claim 10 wherein the shut-off slot has a slot vector that is not parallel to a main die vector.

12. The system of claim 10 wherein the main die vector is defined by a direction of placement of the first part and the second part of the tool.

13. The system of claim 10 wherein the first component is configured to receive a second component.

14. The system of claim 13 wherein the second component has a vector that is not parallel to the slot vector.

15. The system of claim 10 wherein the second component has a center portion that engages with the second part of the first component.

16. The system of claim 10 wherein the second component has side portions that are in contact with the first part of the first component.

17. The system of claim 10 wherein the amount of offset between the first part and the second part is defined by a shut-off angle.

18. A method of aligning a first component and a second component with elastic averaging, the method comprising:

positioning the first component between a tool with a first part and a second part;

pressing together the first part and the second part of the tool to offset a first part and a second part of the first component; and creating a shut-off slot between the first part and the second part of the first component by offsetting the first part and the second part, wherein the shut-off slot has a slot vector that is not parallel to a main die vector, the main die vector being defined by a direction of placement of the first part and the second part of the tool.

19. The method of claim 18 further comprising removing the tool and inserting the second component into the first component wherein the second component has a vector that is not parallel to the slot vector.

20. The method of claim 18 wherein the amount of offset between the first part and the second part is defined by a shut-off angle.

* * * * *